Nov. 11, 1924.

F. T. KENNEDY 1,514,664

PROCESS OF PREPARING IRON FOR MALLEABLE CASTINGS

Filed Nov. 19, 1923   2 Sheets-Sheet 2

Inventor
Frederic T. Kennedy.
By Munday, Clarke & Carpenter
Attys.

Patented Nov. 11, 1924.

1,514,664

UNITED STATES PATENT OFFICE.

FREDERIC T. KENNEDY, OF RIVER FOREST, ILLINOIS.

PROCESS OF PREPARING IRON FOR MALLEABLE CASTINGS.

Application filed November 19, 1923. Serial No. 675,478.

*To all whom it may concern:*

Be it known that I, FREDERIC T. KENNEDY, a citizen of the United States, residing in River Forest, in the county of Cook and State of Illinois, have invented a new and useful Improvement in Processes of Preparing Iron for Malleable Castings, of which the following is a specification.

My invention relates to a method of preparing iron adapted to be made into malleable castings.

The object of the invention is two-fold, being first to materially increase the output of an existing plant with but slight increase in cost, and, second, to overcome the difficulties commonly experienced as a result of the presence of relatively high manganese content in the pig iron used in making the castings.

It is well-known to those familiar with the conditions in a malleable iron foundry that the output of the usual melting furnace employed, which may be either an open hearth, electric, or air furnace, is limited rather by its capacity to melt sufficient metal in the period of time permissible by shop operations than the physical capacity of the furnace to hold sufficient quantities of iron. That is to say, the time between the firing of the furnace and the pouring of the molds is limited by the hours of the work day, so that the metal which can be melted in the time available is less than the physical capacity of the furnace. In accordance with the process of my invention, the limits of capacity just referred to are removed and the utilization of the entire physical capacity of the melting furnace within practical limits of time is rendered possible.

While it is possible to obtain high production economically by the cupola method of melting, it is known in practice that the analysis of iron so prepared is not consistent, due largely to the fact that the fuel and the charge to be melted are intermingled, with resultant lack of uniformity of chemical content in the different strata or charges of metal. It is true that consistent analysis might be obtained in cupola iron by skilled attention, but, in practical operation, this is not the case and, therefore, open hearth, air, or electric furnaces are commonly used in malleable iron foundries as the primary melting medium.

The process of my invention is designed to increase the output of such foundries by making use of the cupola melting capacity and economy of operation in conjunction with the usual primary furnace, the cupola charge, or charges, being added to a charge melted in said furnace, thus utilizing the additional holding capacity of the latter and permitting mixing, or treating, to obtain proper analysis.

Inasmuch as it is becoming increasingly difficult to obtain pig iron sufficiently low in manganese so that the manganese-sulphur ratio, necessary to cause the iron to malleableize properly, may be maintained, my invention has the further advantage that the sulphur normally added in the cupola preserves a proper ratio when iron relatively high in manganese is used.

While my method may be carried out by various forms and arrangements of apparatus, I have shown upon the drawings a suitable lay-out for practicing the invention, said drawings being rather for the purpose of assisting in giving a full understanding of the practical working of the process than for indicating any particular structural requirements.

Referring to the drawings,—

Figure 1:
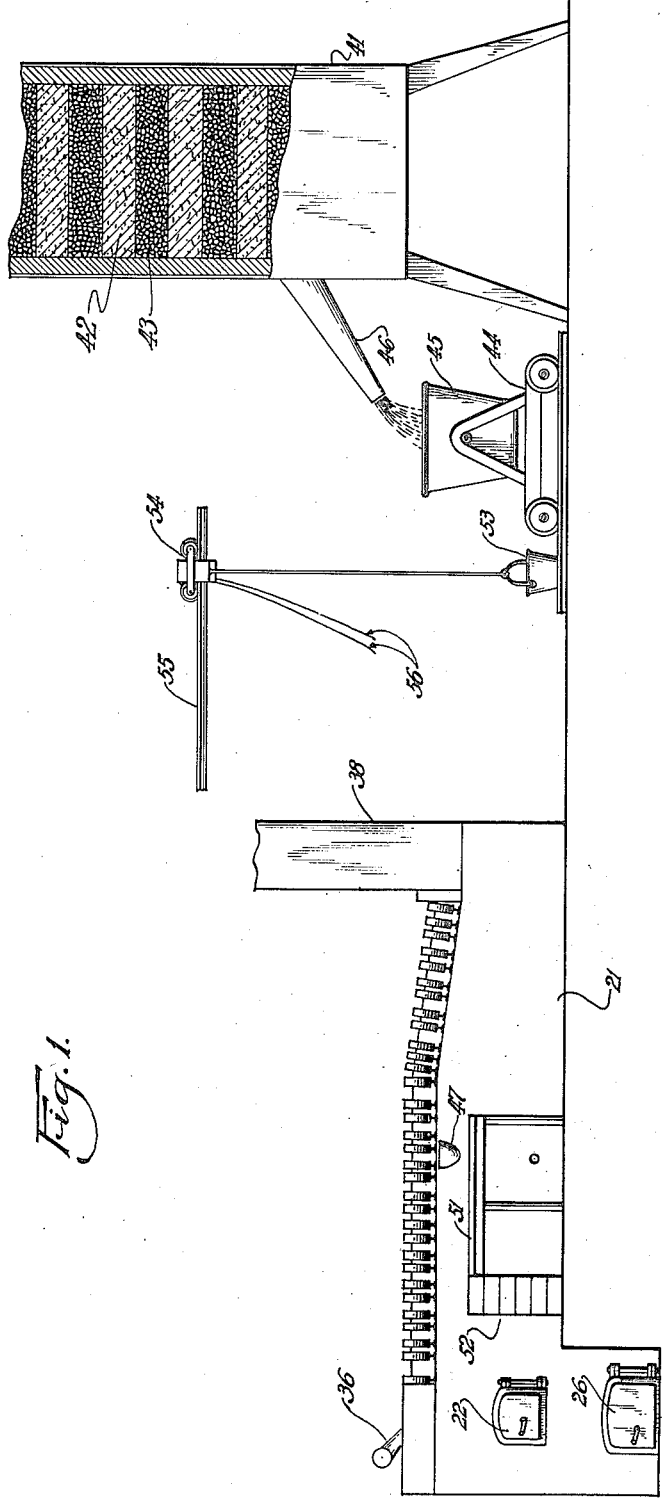
Figure 1 is a largely diagrammatic view of a furnace and cupola lay-out and means for transferring the metal, the parts being shown partly in side elevation and partly in section and being broken away for convenience in illustration.

The melting furnace, which is generally indicated by the reference character 21, is of the air blast type, though it will be evident that an electric, or open hearth furnace, might be employed if preferred, since the invention is not concerned with any particular apparatus and any of the usual or approved types of furnace used in malleable iron foundries are contemplated. A door 22 opens into a fire box 23, in which there is provided a grate 24. A blast pipe 25 extends rearwardly from a door 26 and beneath the grate 24 to supply air to support combustion of the fuel 27 and to direct the flames upwardly for a purpose which will hereinafter appear. A melting chamber 28 is provided between front and rear bridges, indicated respectively by the reference characters 29 and 31, said bridges being built to desired height by fire brick of the usual character. Pig iron, or scrap, or both, may be deposited in the chamber 28 through a top opening 32, which is adapted to be closed by means of brick arches 33 supported by suitable I-beams 34.

Figure 2:
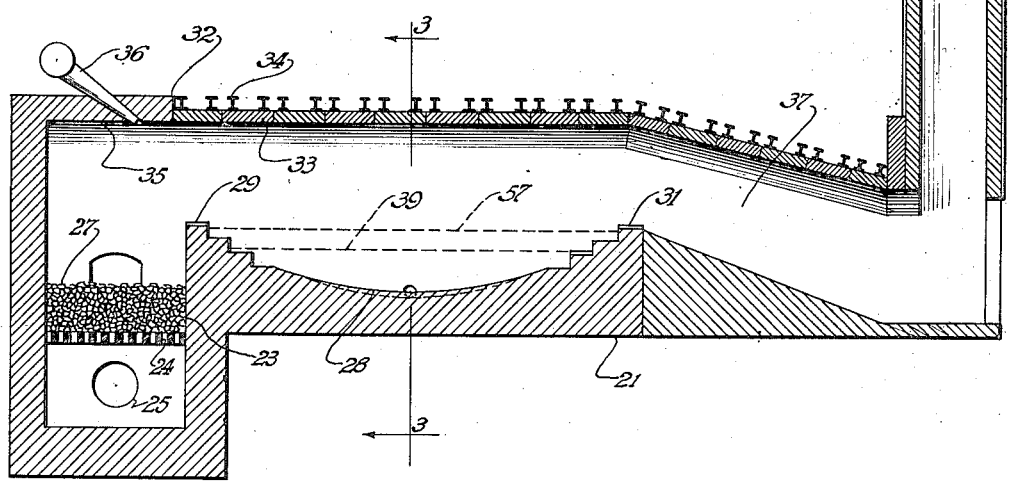
Fig. 2 is a longitudinal section of an air furnace, such as is shown at the left in Fig. 1.
Figure 3:
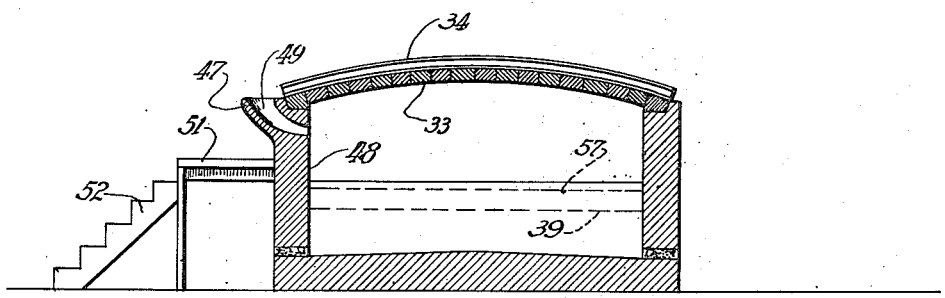
Fig. 3 is a front-to-back section, taken substantially on the section line 3—3 in Fig. 2.

The flames from the fuel 27 are directed over the bridge 29 and across the furnace by the top 35 of the furnace structure and by air admitted through a top blast pipe 36. These flames thus pass over and through the iron to be melted, the products of combustion then passing through a downwardly inclined passageway 37 beyond the bridge 31 and out through a flue 38 at the side of the furnace remote from the fire box 23. In accordance with common foundry practice, the molds are poured twice each day, it being thus necessary to draw off the first charge at a relatively early hour in order to permit the second one to be completely melted before time for quitting work in the afternoon. Furthermore, from a practical standpoint, the hour of firing in the morning cannot be earlier than a reasonable time for beginning work and thus both periods are limited, in order that they may be included in the working day. It has been found that the amount of metal which can be melted within the allotted time does not completely fill the melting chamber 28 of the ordinary furnace in use, but may perhaps fill it only to the dotted line indicated by the reference character 39 in Figs. 2 and 3. This may be sufficient for ordinary requirements of production, but at times of requirement for peak production the capacity is insufficient without extremely expensive increase in equipment in the form of additional furnaces, and possibly buildings. In order to utilize the additional holding capacity of the furnace chamber and thus to increase the output without the great cost which would be entailed by installing additional furnaces, I employ, in conjunction with the furnace 21, a cupola, which is generally indicated by the reference character 41.

Said cupola may be of usual form, the metal being deposited therein in layers 42 between layers of fuel 43. In accordance with my invention, the cupola is charged at such time that the melted metal may be drawn off at approximately the time of completion of melting in the furnace chamber 28. The cupola metal may then be transferred to the furnace by means of a buggy 44, supporting a ladle 45, adapted to receive the molten metal from a delivery spout 46 of the cupola. A pour-back 47 is formed in the upper part of one of the end walls 48 of said furnace and the metal from the cupola may conveniently be poured into the furnace chamber through the passage 49 in said pour-back, it being understood that the pour-back is a part of the regular furnace structure and is employed normally for pouring back metal which has been removed from the furnace for heating ladles, etc. A platform 51 is provided beneath the pour-back 47 and steps 52 lead from the floor to said platform. While any suitable means may be used for pouring the metal into the pour-back 47, I have shown in the drawings a bucket hoist 53 supported from a trolley 54 on overhead tracks 55 and adapted to be operated by hoisting and lowering lines 56, which may be manipulated by an attendant standing upon the platform 51. In this manner, the furnace chamber 28 may be filled beyond its melting capacity within permitted time limits, as, for example, to the extent indicated by the dotted line 57. The cupola metal may then be thoroughly mixed and, if desirable, the chemical content may be regulated by the addition of suitable substances, such as carbon, silicon, steel, iron ore, etc., during the mixing operation. I prefer to test the material delivered from the cupola and also that in the furnace prior to the mixing, in order that the analysis of the resultant metal may be checked and suitable additions made, if necessary, as referred to above.

This method, in addition to greatly increasing the capacity of the foundry for given units of equipment, also results in the production of a superior and more consistent quality of metal than is normally obtained from a cupola, for reasons hereinbefore pointed out. The very mixing of the different strata of metal from the cupola causes an averaging of chemical content which produces a more consistent resultant product and, from certain aspects of the invention, it may be desirable to use the furnace chamber 28 merely as a mixing chamber for the different charges delivered from the cupola.

In ordinary practice, it is known that the sulphur content of metal which is melted in a cupola is increased in accordance with conditions surrounding the operations. When, therefore, a cupola is used in accordance with the method provided by my invention, the sulphur added in the cupola will permit of the use of higher manganese pig iron than could be used in the primary furnace alone, since it is necessary to maintain a proper sulphur-manganese ratio. In this manner, the difficulty resulting from the presence of relatively high manganese content in castings is largely overcome.

As many foundries are equipped with one or more cupolas and all have a primary furnace, such as has been hereinbefore described, the apparatus necessary for carrying out my method will not entail appreciable additional expense, or, in any event, the additional expense will be relatively slight. The rate of production may, on the other hand, be greatly increased and it will be obvious that the higher rate of production may be maintained regularly by practicing the process at all times, or the furnaces may be continued in service as now operated and the cupola additions made only in times of peak production, when it becomes necessary to produce additional metal. The cupola, if desired, may be arranged adjacent the furnace so as to discharge directly into the latter, or may be spaced in accordance with particular foundry conditions and the metal transferred in any desired manner, as, for example, by some such medium as that illustrated in Fig. 1.

It is thought that the invention and many of its attendant advantages will be understood from the foregoing description, and it will be apparent that various forms of apparatus may be used for carrying out the method of my invention without departing from the spirit and scope of the invention, or sacrificing all of its material advantages, the form hereinbefore described being merely a preferred embodiment thereof.

I claim:

1. The process of preparing iron for malleable castings, which consists in melting in a primary furnace a charge of such amount as may be melted within practical time limits, and adding thereto a charge melted in a cupola to increase the output of the furnace.

2. The process of preparing iron for malleable castings, which consists in melting in a primary furnace a charge of such amount as may be melted within practical limits, melting an additional charge in a cupola, and intermixing said charges in the furnace to equalize the chemical content thereof.

3. The process of preparing iron for malleable castings, which consists in melting in a primary furnace a charge of such amount as may be melted within practical limits, melting an additional charge in a cupola, and treating the combined charges to produce a final product of desired chemical content.

4. The process of preparing iron for malleable castings, which consists in melting in a primary furnace a charge of such amount as may be melted within practical limits, melting an additional charge in a cupola, and treating the combined charges by suitable additions, to produce a final product of desired chemical content.

5. The process of preparing iron for malleable castings, which consists in melting a charge of iron in a primary furnace, melting another charge in a cupola, analyzing each charge, transferring the cupola charge to the furnace, and mixing said charges in the furnace in such proportions as to produce a final product of desired chemical content.

6. The process of preparing iron for malleable castings, which consists in melting a charge of iron in a primary furnace, melting another charge in a cupola, analyzing each charge, transferring the cupola charge to the furnace, analyzing the resultant metal, and treating the latter to obtain a final product of desired chemical content.

7. The process of preparing iron for malleable castings, which consists in melting a quantity of iron high in manganese in a primary furnace, melting an additional quantity in a cupola whereby the sulphur content is increased, and mixing the cupola iron with that in the furnace to equalize the chemical content and obtain a proper sulphur-manganese ratio.

FREDERIC T. KENNEDY.